United States Patent
Yen et al.

(10) Patent No.: US 8,836,261 B2
(45) Date of Patent: Sep. 16, 2014

(54) DETECTION CONTROL SYSTEM

(71) Applicant: Feeling Technology Corp., Hsinchu County (TW)

(72) Inventors: Sheng-Hsiang Yen, Hsinchu (TW); Hsuan-Chuan Chen, Hsinchu (TW)

(73) Assignee: Feeling Technology Corp., Hsinchu (TW)

( * ) Notice: Subject to any disclaimer, the term of this patent is extended or adjusted under 35 U.S.C. 154(b) by 169 days.

(21) Appl. No.: 13/675,106

(22) Filed: Nov. 13, 2012

(65) Prior Publication Data

US 2014/0062367 A1   Mar. 6, 2014

(30) Foreign Application Priority Data

Aug. 30, 2012  (TW) .............................. 101131594 A

(51) Int. Cl.
*H02K 29/08* (2006.01)
*H02P 6/14* (2006.01)

(52) U.S. Cl.
CPC ....................................... *H02P 6/14* (2013.01)
USPC ............ 318/400.38; 318/400.01; 318/400.14; 318/721; 318/400.39; 318/400.4; 388/800; 388/806; 388/815; 388/822

(58) Field of Classification Search
CPC ............. H02K 29/08; H02P 6/16; H02P 6/14; H02P 6/08
USPC ............ 318/400.01, 701, 718, 721, 722, 727, 318/773, 779, 799, 400.32, 400.14, 400.15, 318/599, 400.29, 400.33, 400.34, 400.35, 318/400.38, 400.39, 400.4, 801, 808, 432, 318/437; 388/800, 806, 815, 822, 823, 921, 388/928.1

See application file for complete search history.

(56) References Cited

U.S. PATENT DOCUMENTS

2002/0167290 A1*  11/2002  Seki .............................. 318/727
2002/0171388 A1*  11/2002  Seki .............................. 318/727

* cited by examiner

*Primary Examiner* — Antony M Paul
(74) *Attorney, Agent, or Firm* — Rosenberg, Klein & Lee

(57) ABSTRACT

A detection control system includes a sensing unit, a control module and a driving module for a motor including a rotor and a stator. The sensing unit electrically connects the motor to sense a first and a second magnetic pole of the rotor cross a chip disposed between the rotor and the stator; a third magnetic pole is alternated to a forth magnetic pole of the stator to generate a sensing signal. A detection unit of the control module detects a kickback voltage value generated by a first current value changing to a second current value to calculate a minimum current value to generate a detecting signal. A timing unit receives the sensing and the detecting signal to calculate a first and a second period of time, and a discharging time. The driving module drives the rotor by receiving a control signal the control unit generates by controlling an alternating time.

10 Claims, 11 Drawing Sheets

DETECTION CONTROL SYSTEM

This application claims the benefits of the Taiwan Patent Application Serial NO. 101131594 filed on Aug. 30, 2012, the subject matter of which is incorporated by reference.

BACKGROUND OF THE INVENTION

1. Field of the Invention

The present invention relates to a detection control system and more particularly, relates to a detection control system controlling the efficiency of a motor by calculating a minimum current value according to a kickback voltage value.

2. Description

Industrial Revolution has brought dramatic changes to human beings and overturned the life mode of people. Among so many inventions, the birth of motor is one of the most known. At present, motors are applied to air conditioners, means of transportations, and various household appliances. Since motors are widely utilized in various fields and industries, people spend a lot of time and money on researching and developing the solutions and performance optimizations of motors. However, although people in the field have devoted considerable resources to the improvement of motors, there are still problems to be solved in motors.

Refer to FIG. 1 to FIG. 1B, schematic views showing a rotation of a conventional motor. According to the figures, a motor 1 includes a rotor 11 and a stator 12, the rotor 11 including two first magnetic poles 111 (only one first magnetic pole is shown) and two second magnetic poles 112 (only one second magnetic pole is shown), wherein the first magnetic poles 111 are north poles and the second magnetic poles 112 are south poles. The stator 12 includes two third magnetic poles 121 (only one third magnetic pole is shown in FIGS. 1 and 1A) and two fourth magnetic poles 122 (only one fourth magnetic pole is shown in FIGS. 1 and 1A), wherein the third magnetic poles 121 are south poles and the fourth magnetic poles 122 are north poles. Furthermore, a chip 2 is disposed between the rotor 11 and the stator 12 and senses a rotation speed of the rotor 11 of the motor 1 rotating. The chip 2 includes a Hall chip.

When the motor 1 rotates toward a direction L1, the rotor 11 rotates clockwise, the first magnetic pole 111 and the second magnetic pole 112 are rotated from positions shown in FIG. 1 to positions shown in FIG. 1A while positions of the third magnetic pole 121 and the fourth magnetic pole 122 of the stator 12 are not changed. Therefore, in the second magnetic pole 122, directions of incorrect moment L2 and L3 are generated to affect the rotation of rotor 11 so that the motor 1 vibrates unnecessarily and noises are generated. Next, when the first magnetic pole 111 and the second magnetic pole 112 are rotated from positions shown in FIG. 1A to positions shown in FIG. 1B, the third magnetic pole 121 of the stator 12 is then alternated to the third magnetic pole 121a and the fourth magnetic pole 122 is then alternated to the fourth magnetic pole 122a; as a result, the performance of the motor 1 is poor. Besides, under other circumstances, the third magnetic pole 121 of the stator 12 is alternated to the third magnetic pole 121a in advance and thus an incorrect moment is generated, which also results in poor performance of the motor 1.

In conclusion, it should be understandable for persons having ordinary skill in the art that due to the rotation of the rotor 11 of the motor 1, when the first magnetic pole 111 and the second magnetic pole 112 pass by the chip 2, the third magnetic pole 121 and the fourth magnetic pole 122 of the stator 12 rotate in advance or lag behind; as a result, the motor 1 vibrates unnecessarily, noises are generated and the performance of the motor 1 is poor. Thus, how to control the motor 1 to perform more efficiently is a problem to be solved in the industry.

SUMMARY OF THE INVENTION

In prior art, due to the rotation of the rotor of a conventional motor, when the first magnetic pole and the second magnetic pole pass by the chip, the third magnetic pole and the fourth magnetic pole of the stator rotate in advance or lag behind; as a result, the conventional motor vibrates unnecessarily, noises are generated and the performance of the conventional motor is poor.

A detection control system is provided according to an embodiment of the present invention, calculating a minimum current value according to a kickback voltage value generated when a first current value corresponding to the third magnetic pole is alternated to a second current value corresponding to the fourth magnetic pole, and further controlling an alternating time of the third magnetic pole alternating to the fourth magnetic pole.

A detection control system for a motor is provided according to an embodiment of the present invention, the motor including a rotor and a stator, the rotor including at least a first magnetic pole and at least a second magnetic pole, a chip being disposed between the rotor and the stator; when the rotor rotates, the first magnetic pole passes by the chip in a first period of time, the second magnetic pole passes by the chip in a second period of time and the polarity of a third magnetic pole of the stator is simultaneously alternated with the polarity of a fourth magnetic pole with an alternating time; the detection control system including a sensing unit, a control module and a driving module.

The sensing unit electrically connects the motor, the sensing unit detecting situations of the first magnetic pole and the second magnetic pole passing by the chip and the third magnetic pole being alternated with the fourth magnetic pole so as to generate and send a sensing signal. The control module electrically connects the sensing unit and includes a detecting unit, a timing unit and a control unit. The detecting unit electrically connects the sensing unit, the detecting unit detecting a kickback voltage value generated when the first current value corresponding to the third magnetic pole is alternated with a second current value corresponding to the fourth magnetic pole, the detecting unit calculating a minimum current value according to the kickback voltage value and generating a detecting signal. The timing unit electrically connects the sensing unit and the detecting unit, the timing unit receiving the sensing signal and the detecting signal to calculate the first period of time and the second period of time and to calculate a discharging time of the first current value being discharged to the minimum current value. The control unit electrically connects the timing unit, the control unit controlling the alternating time according to the first period of time, the second period of time and the discharging time so as to generate and send a control signal. The driving module electrically connects the motor and the control unit, the driving module receiving the control signal so as to drive the rotor.

Preferably, the motor includes a Brushless DC motor, the chip includes a Hall sensing element and the chip is disposed on the rotor. The detection unit, the control unit and the driving module are disposed in the chip, the detecting unit is disposed in the group selected from the rotor and the stator, and the chip is disposed close to the stator. The detection control system further includes a storage unit electrically connecting the timing unit for storing the first period of time, the second period of time, the discharging time and the alternating time.

The minimum current value includes 0. The polarity of the first magnetic pole is different from the polarity of the second magnetic pole, the polarity of the third magnetic pole is different from the polarity of the fourth magnetic pole, and the polarity of the first, second, third and the four magnetic pole is selected from the north pole and the south pole. The detecting unit further includes a voltage comparator installed with a threshold value, the threshold value to be compared with the kickback voltage value so that the minimum current value is calculated. When the polarity of the third magnetic pole is alternated with the polarity of the fourth magnetic pole, the first current value is decreased to the minimum current value and increased to the second current value. The control unit controls the speed of the first current value changing into the second current value and the alternating time.

In prior art, due to the rotation of the rotor of a conventional motor, when the first magnetic pole and the second magnetic pole pass by the chip, the third magnetic pole and the fourth magnetic pole of the stator rotate in advance or lag behind; as a result, the conventional motor vibrates unnecessarily, noises are generated and the performance of the conventional motor is poor.

Compared with prior art, the detection control system according to an embodiment of the present invention, calculates a minimum current value according to a kickback voltage value generated when a first current value corresponding to the third magnetic pole is alternated to a second current value corresponding to the fourth magnetic pole, and further controls an alternating time of the third magnetic pole alternating to the fourth magnetic pole.

Thus, since the detection control system according to an embodiment of the present invention calculates a minimum current value according to a kickback voltage value generated when a first current value is alternated to a second current value and further control an alternating time of the third magnetic pole alternating to the fourth magnetic pole, a shift of phase is controlled to be advanced or delayed; thus the efficiency of a motor is improved.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENT

The present invention relates to a detection control system. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
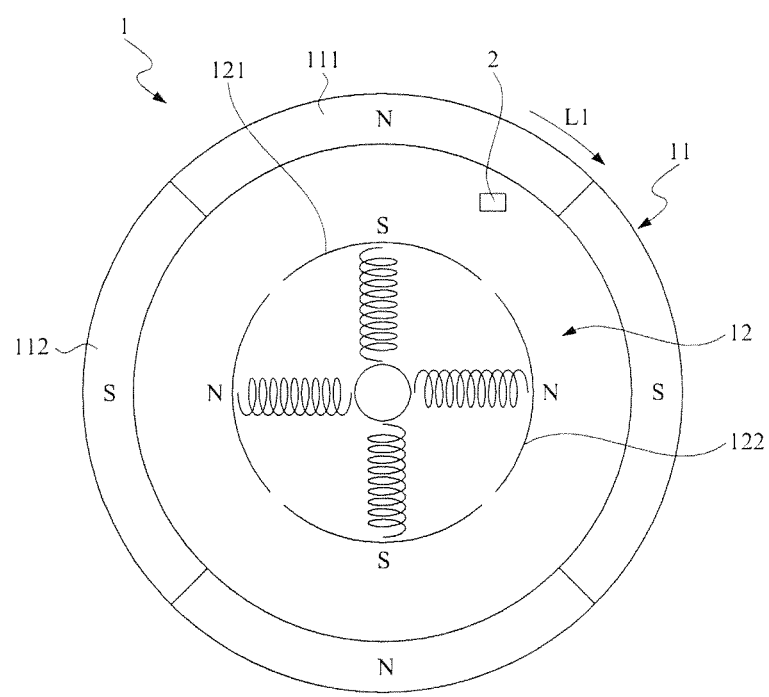
FIG. 1 to FIG. 1B are schematic views showing a rotation of a conventional motor.
Figure 1A:
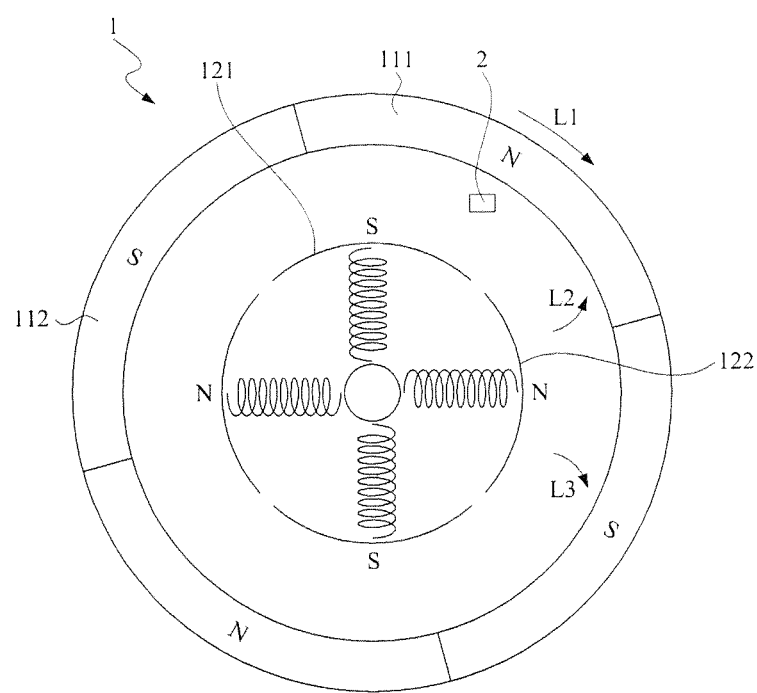
Figure 1B:
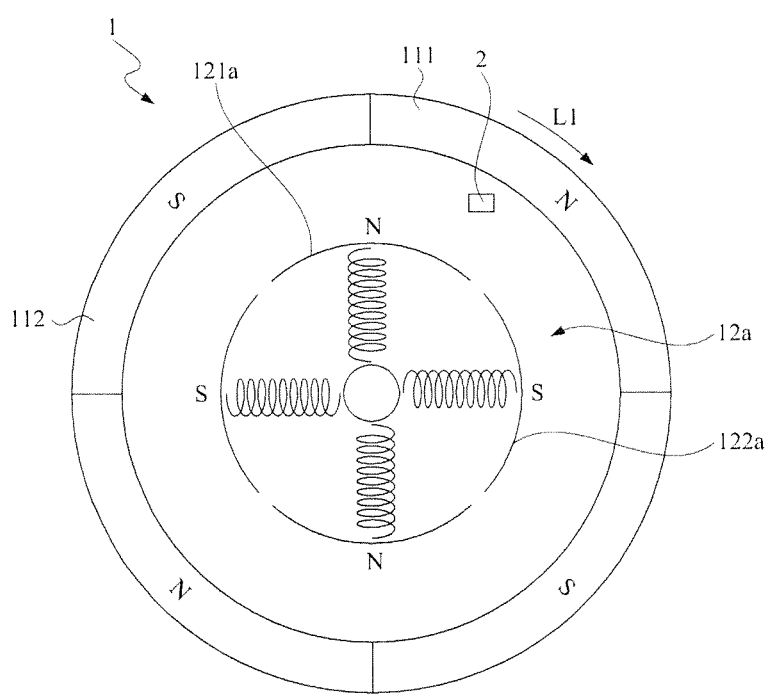
Figure 2:
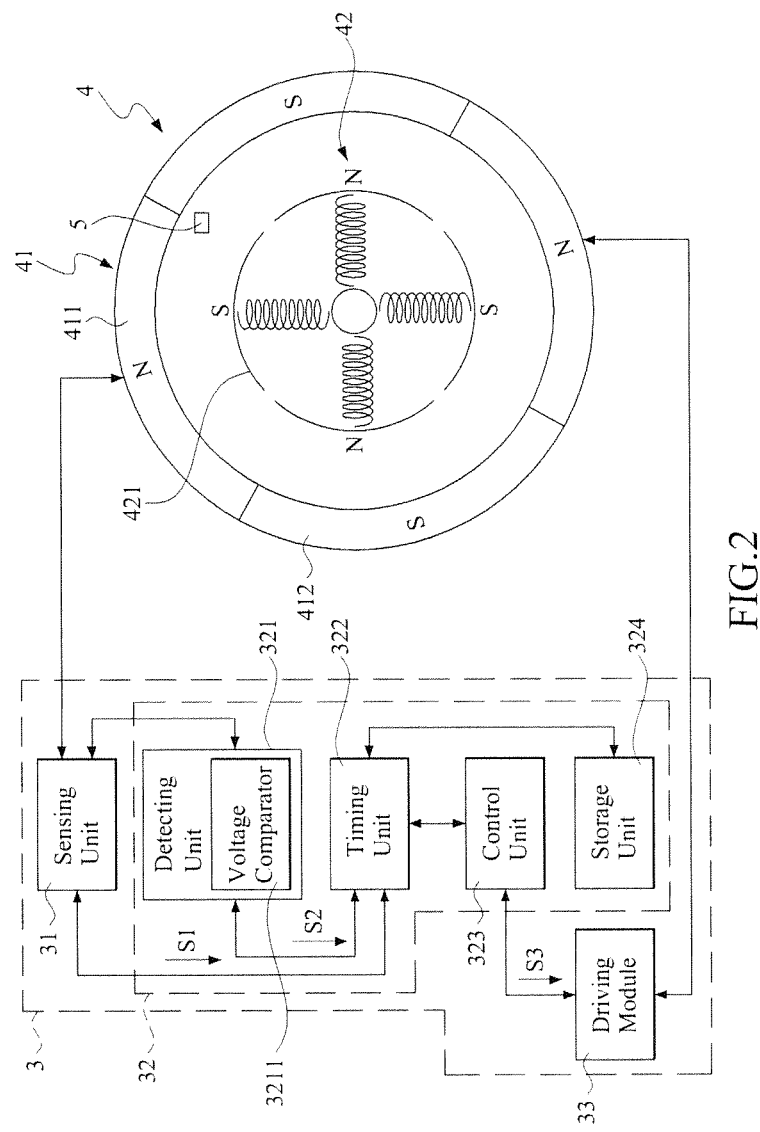
FIG. 2 is a block diagram showing a motor including a detection control system of an embodiment of the present invention.

Refer to FIG. 2, a block diagram showing a motor including a detection control system of an embodiment of the present invention. A detection control system 3 for a motor 4 is provided, the motor 4 including a rotor 41 and a stator 42, the rotor 41 including two first magnetic poles 411 (only one first magnetic pole is shown) and two second magnetic pole 412 (only one second magnetic pole is shown); the first magnetic pole 411 is different from the second magnetic pole 412, the first magnetic pole 411 is north pole and the second magnetic pole 412 is south pole. A chip 5 is disposed between the rotor 41 and the stator 42. According to other embodiments, the chip 5 is disposed close to the stator 42. It should be clarify that, according to an embodiment of the present invention, the stator 42 is not permanent magnetic. According to an embodiment of the present invention, the motor 4 includes a brushless DC motor and the chip 5 is disposed on an area which is at the angle of 45 degrees of the stator 42; more particularly, the 45 degrees area of the stator 42 is where the stator 42 does not include a magnetic filed, that is, the area is not affected by polarities. The chip 5 includes a Hall sensing element. According to other embodiments, the chip 5 is disposed on the rotor or close to the stator 42, including areas which are affected by electric fields. It should be mentioned that the motor 4 is identical to the conventional motor 1 and the chip 5 is identical to the conventional chip 2. The referential numbers are various according to embodiments of the present invention so as to distinguish these parts.

The detection control system 3 includes a sensing unit 31, a control module 32 and a driving module 33. The sensing unit 31 electrically connects the motor 4. The control module 32 electrically connects the sensing unit 31 and includes a detecting unit 321, a timing unit 322, a control unit 323 and a storage unit 324. The detecting unit 321 electrically connects the sensing unit 31 and includes a voltage comparator 3211 installed with a threshold value. The timing unit 322 electrically connects the sensing unit 31 and the detecting unit 321. The control unit 323 electrically connects the timing unit 322 and the storage unit 324 electrically connects the timing unit 311. According to other embodiments of the present invention, the sensing unit 31 is integrated in the control module 32. According to other embodiments of the present invention, the detecting unit 321 is disposed in the rotor 41 or the stator 42; the driving module 33 is disposed between and electrically connects the motor 4 and the control unit 323. In other embodiments of the present invention, the detecting unit 321, the control unit 323 and the driving module 33 are integrated and disposed in the chip 5.

Figure 3:
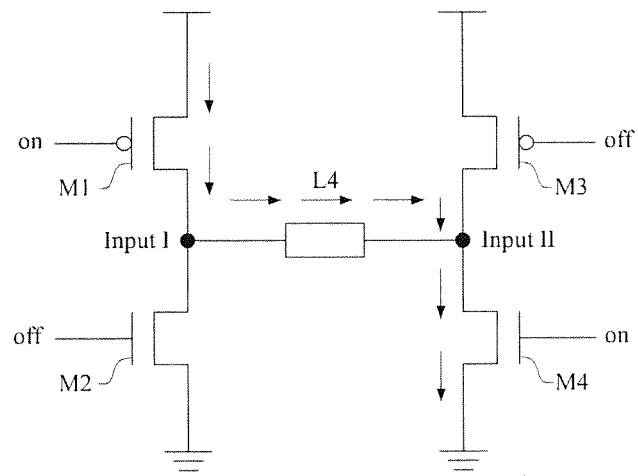
FIG. 3 to FIG. 3C are schematic views showing a kickback voltage being formed according to an embodiment of the present invention.
Figure 3C:
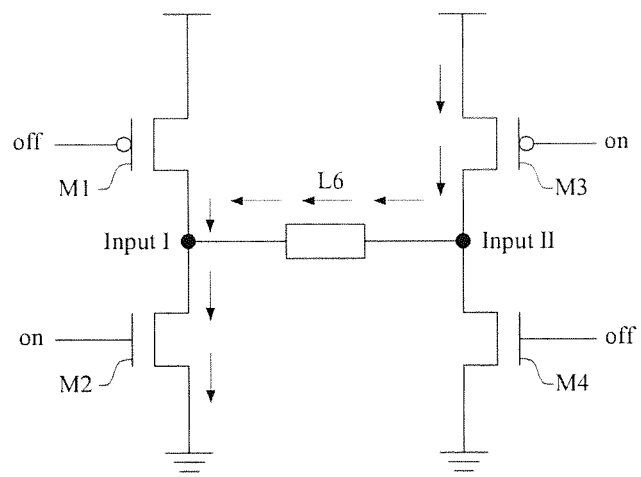
Figure 4:
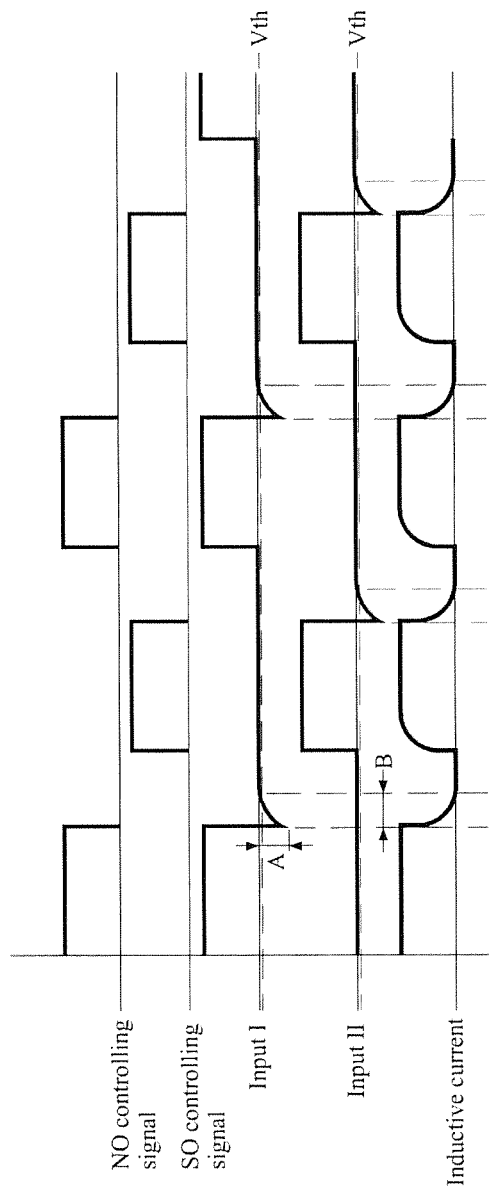
FIG. 4 is a schematic view showing a first waveform of a motor including a detection control system of an embodiment of the present invention.
Figure 5:
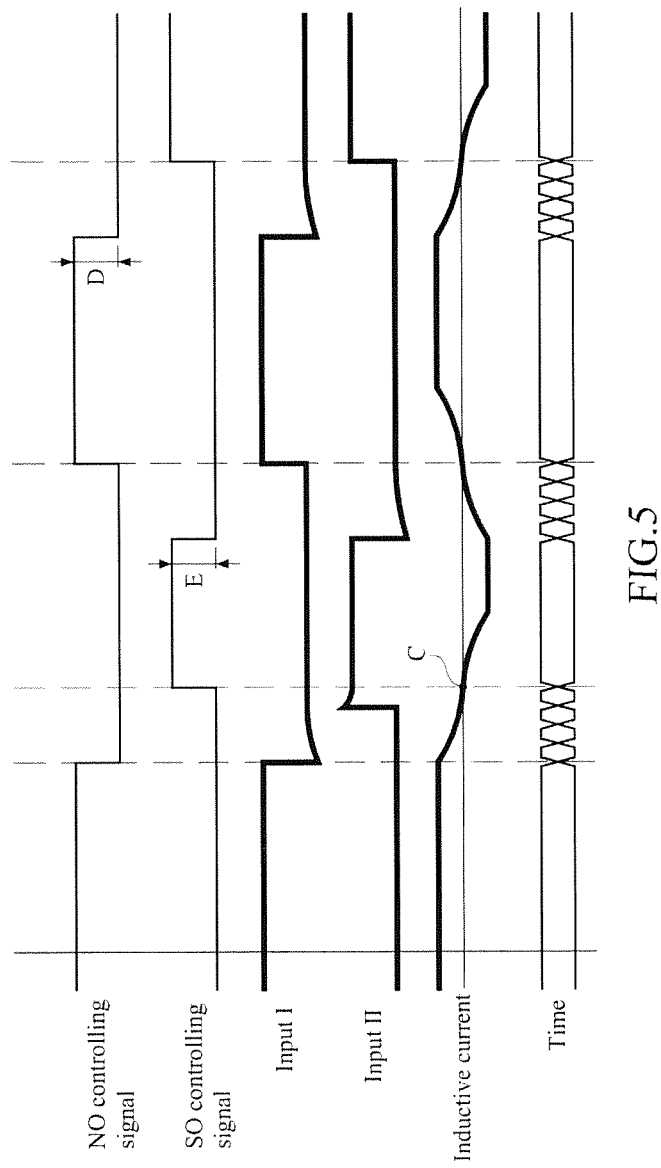
FIG. 5 is a schematic view showing a second waveform of a motor including a detection control system of an embodiment of the present invention.

Refer to FIG. 2 to FIG. 5. FIG. 3 to FIG. 3C are schematic views showing a kickback voltage being formed according to an embodiment of the present invention; FIG. 4 is a schematic view showing a first waveform of a motor including a detection control system of an embodiment of the present invention; FIG. 5 is a schematic view showing a second waveform of a motor including a detection control system of an embodiment of the present invention According to the figures, when the rotor 41 rotates, the first magnetic pole 411 passes by the chip 5 in a first period of time, the second magnetic pole 412 passes by the chip 5 in a second period of time and the polarity of a third magnetic pole 421 of the stator 42 is simultaneously alternated with the polarity of a fourth magnetic pole with an alternating time and the chip 5 simultaneously detecting the rotation speed when the rotor 41 rotates. The third magnetic pole 421 is different from the fourth magnetic pole; when the third magnetic pole 421 is south pole, the fourth magnetic pole is north pole. When the first magnetic pole 411 passes by the chip 5 in a first period of time, the second magnetic pole 412 passes by the chip 5 in a second period of time, the south pole of the third magnetic pole 421 is alternated with the north pole of the fourth magnetic pole.

When the rotor 41 rotates, the sensing unit 31 detects situations of the first magnetic pole 411 and the second magnetic pole 412 passing by the chip 5 and the third magnetic pole 421 being alternated with the fourth magnetic pole so as to generate and send a sensing signal S1. More particularly, the sensing unit 31 detects the changes of magnetic fields brought by the rotation of the rotor 41 so as to generate a sensing signal S1. The detecting unit 321 detects a kickback voltage value generated when a first current value corresponding to the third magnetic pole 421 is alternated with a second current value corresponding to the fourth magnetic pole, the detecting unit calculating a minimum current value according to the kickback voltage value and generating a detecting signal S2. The voltage comparator 3211 is installed with a threshold value to be compared with the kickback voltage value so as to calculate the minimum current value. Besides, according to an embodiment of the present invention, the minimum current value includes 0 and when the polarity of the third magnetic pole 421 is alternated with the polarity of the fourth magnetic pole, the first current value is decreased to the minimum current value and increased to the second current value.

More particularly, when the rotor 41 rotates, the control unit 323 controls the stator 42 to perform a change of polarity (that is, the third magnetic pole 421 is alternated to the fourth magnetic pole) so that the driving module 33 drives the rotor 41 to continuously rotate. Further, during the change of polarity, the control unit 323 controls and switches a bridge switch of a bridge circuit of the stator 42, wherein switch M1 and M4 in FIG. 3 are switched "ON" and switch M2 and M3 are switched "OFF"; the current generated flows in direction L4 as FIG. 3; the direction L4 goes through an inductive element in the middle and to a ground terminal so as to discharge; the inductive element includes coils inside the stator 42 in FIG. 2.

Figure 3A:
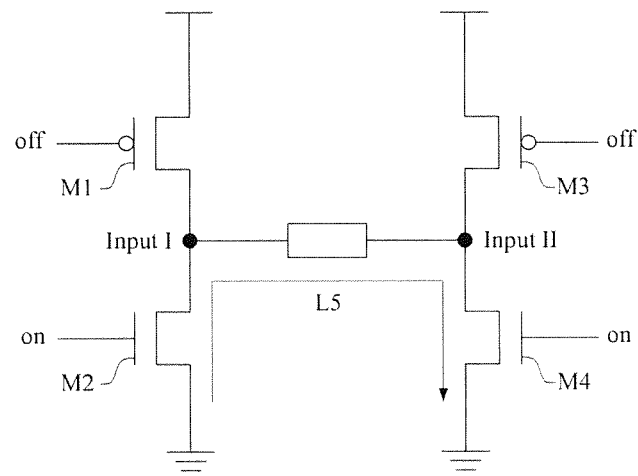

When the third magnetic pole 421 is alternated to the fourth magnetic pole, the control unit 323 switches the bridge switch as it is shown in FIG. 3A, in which switch M2 and M4 are switched "ON" and switch M1 and M3 are switched "OFF" and there are still currents surviving on the inductive elements and thus the currents are discharged via a base and leakage currents are generated and flow in direction L5 as FIG. 3A. At this moment, the kickback voltage is generated in output I (corresponding to interval A in FIG. 4) and its discharging curve is exponential curve (as Inductive Current shown in FIG. 4, in absolute value). More particularly, when the bridge switch starts to switch, there are still currents surviving in the inductive of the coils of the stator 42 and thus there are leakage currents so a voltage, i.e. the kickback voltage, is detected in output I. Besides, the detecting unit 321 detects the kickback voltage value and compares the value with the threshold value (Vth in FIG. 4) installed in the voltage comparator. According to an embodiment of the present invention, the threshold value is near zero voltage, that is, near zero current, and further the minimum current value is calculated. For better explanation, an absolute minimum current value includes 0 according to an embodiment of the present invention.

Figure 3B:
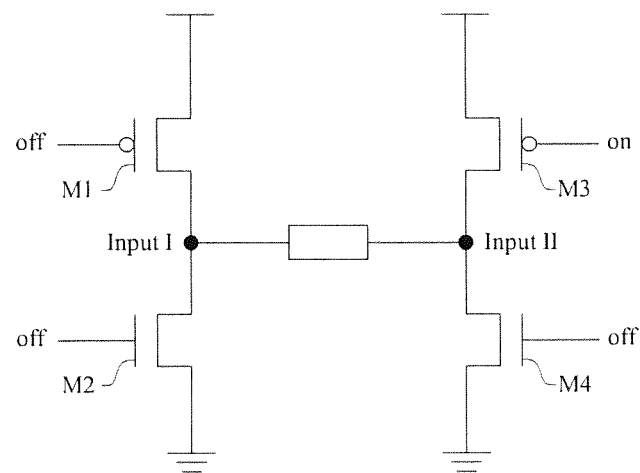

After the currents on the inductive are all discharged, the inductive current is zero and as it is shown in FIG. 3B, switch M1, M2 and M4 are switched "OFF" and switch M3 is switched "ON"; when the third magnetic pole 421 is alternated to the fourth magnetic pole 421, the control unit 323 switches the bridge switch into a situation as shown in FIG. 3C, switch M2 and M3 are switched "ON" and switch M1 and M4 are switched "OFF" so that the currents flow toward a direction L6 as in FIG. 3C and thus the change of polarity is finished. The situation of the fourth magnetic pole alternating to the third magnetic pole 421 is similar to the above descriptions, the only difference is that the above mentioned kickback voltage value is a kickback voltage with negative pressure and the kickback voltage value generated when fourth magnetic pole alternating to the third magnetic pole 421 is a kickback with positive pressure. Kickback with negative pressure and positive pressure are both detected according to embodiments of the present invention, a phase shifting time of the motor is therefore detected and the timing of change of polarity is further controlled. The wave form in FIG. 4 is also represented as FIG. 5, wherein the minimum current value corresponds to minimum current point C in FIG. 5.

The sensing signal S1 and the detecting signal S2 generated by the sensing unit 31 and the detecting unit 321 are sent to the timing unit 322. The timing unit 322 then calculates the first period of time, the second period of time and a discharging time of the first current value being discharged to the minimum current value (as interval B of the inductive current in FIG. 4).

The control unit 323 controls the alternating time according to the first period of time, the second period of time and the discharging time calculated by the timing unit 322. More particularly, the control unit 323 controls the alternating time by controlling the speed of the first current value changing to the second current value. According to an embodiment of the present invention, the control unit 323 generates and sends a controlling signal S3 (the ON controlling signal and the SO controlling signal in FIG. 4) to the driving module 33 so that the driving module controls the speed of the first current value changing to the second current value according to the controlling signal S3. For example, interval D and interval E in FIG. 5 show that the controlling signal S3 controls the first current value being changing to the second current value by means of leading phase. More particularly, the driving module 33 provides currents to the coils of the stator 42 to change the polarity according to the controlling signal S3 and so as to drive the rotor 41 to rotate.

The storage unit 324 stores storing the first period of time, the second period of time, the discharging time and the alternating time and simultaneously generates the diagram of "Time" in FIG. 5. More particularly, the timing unit 322 calculates and records the time of motor 4 changing phases, the time of the first current value on the inductive being discharged to the minimum current value and the time of generating the kickback voltage so as to generate the diagram of "Time" in FIG. 5. That is, the detection control system 3 provided according to an embodiment of the present invention continuously detects, senses and controls the motor 4 so that the chip 5 is continuously disposed in the area of the angle of 45 degree of the stator 42, wherein according to an embodiment of the present invention, since there are four directions in the coil (i.e. upper, down, left, right), the area of the angle of 45 degree of the stator 42 is located in the center of the right coil and the upper coil (i.e. in the angle of 45 degree from the right coil).

According to other embodiments of the present invention, the control module 323 switches and controls the speed of the third magnetic pole 421 of the stator 42 being alternated to the fourth magnetic pole by inputting pulse width modulation (PWM) signal under advanced or delayed phase. There are many ways of alternating according to other embodiments of the present invention and will be omitted herewith.

Figure 6:
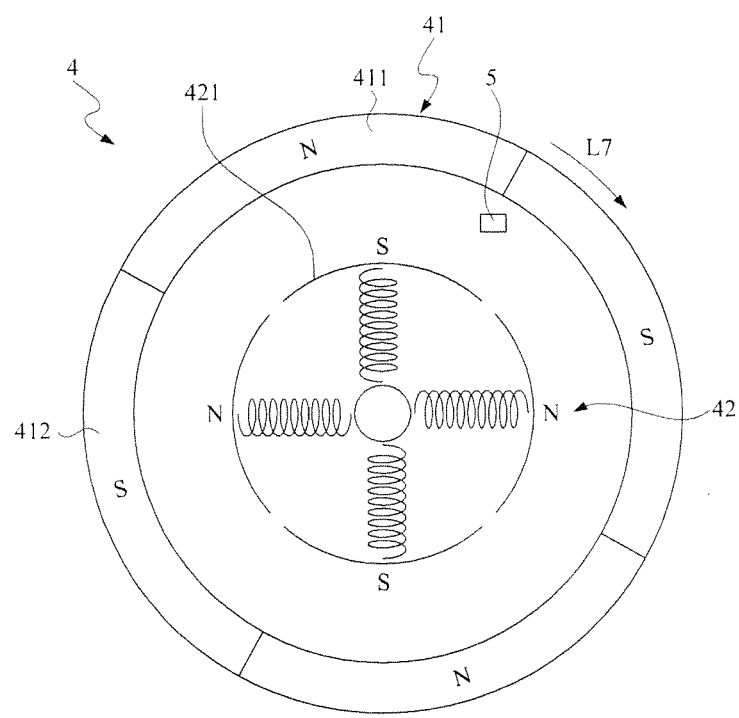
FIG. 6 to FIG. 6B are schematic views showing a rotation of a motor according to an embodiment of the present invention.
Figure 6A:
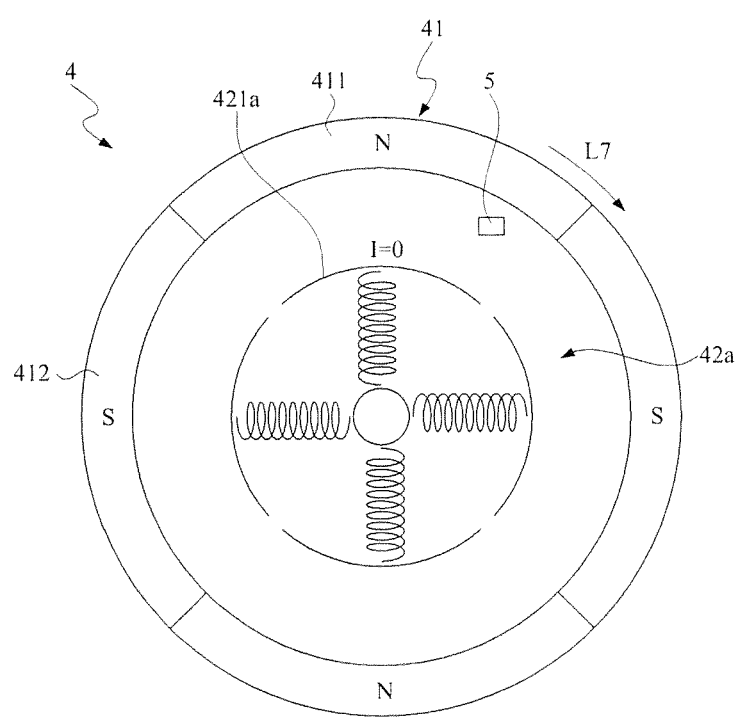
Figure 6B:
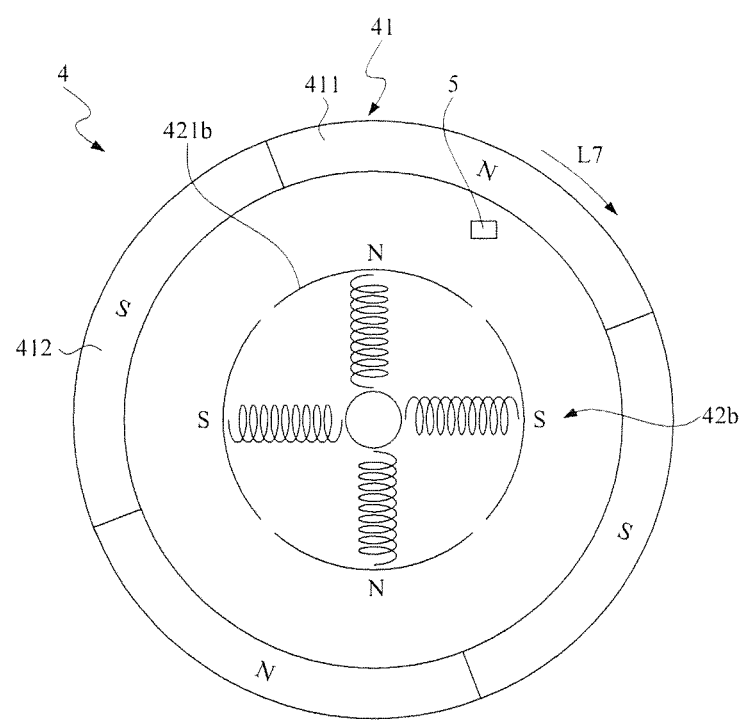

Refer from FIG. 6 to FIG. 6B, schematic views showing a rotation of a motor according to an embodiment of the present invention. After the rotor 41 rotates toward direction L7 as shown in FIG. 6, when the first magnetic pole 411 and the second magnetic pole 412 are changed from the positions in FIG. 6 to positions in FIG. 6A, the third magnetic pole 421a of the stator 42a has alternated under advanced phase (FIG. 6A) so that the currents in the third magnetic 421a is zero and do not have polarity (as the situation shown in FIG. 3B); then when the rotor 41 continues to rotate toward direction L7, the third magnetic pole 421a is alternated to the third magnetic pole 421b (FIG. 6B); as a result, incorrect moment is not generated when the motor 4 is rotating.

In conclusion, compared with prior art, the detection control system of embodiments of the present invention detects the kickback voltage value generated when the first current value changing to the second current value, calculates the minimum current value according to the kickback voltage value, controls the alternating time of the third magnetic pole 421 alternating to the fourth magnetic pole according to the discharging time of the first current value being discharged to the minimum current value, controls the advanced or delayed phase shifting of stator 42, and optimizes the performance of the motor 4. The chip 5 is disposed in the area of the angle of 45 degree of the stator 42; therefore, there is no need to regularly change the position of the chip 5.

While the present invention has been particularly shown and described with reference to a preferred embodiment, it will be understood by those skilled in the art that various changes in form and detail may be without departing from the spirit and scope of the present invention.

What is claimed is:

1. A detection control system for a motor, the motor including a rotor and a stator, the rotor including at least a first magnetic pole and at least a second magnetic pole, a chip being disposed between the rotor and a stator; when the rotor rotates, the first magnetic pole passes by the chip in a first period of time, the second magnetic pole passes by the chip in a second period of time and the polarity of a third magnetic pole of the stator is simultaneously alternated with the polarity of a fourth magnetic pole with an alternating time, the detection control system comprising:

a sensing unit electrically connecting the motor, the sensing unit detecting situations of the first magnetic pole and the second magnetic pole passing by the chip and the third magnetic pole being alternated with the fourth magnetic pole so as to generate and send a sensing signal;

a control module electrically connecting the sensing unit, the control module including:

a detecting unit electrically connecting the sensing unit, the detecting unit detecting a kickback voltage value generated when the first current value corresponding to the third magnetic pole is alternated with a second current value corresponding to the fourth magnetic pole, the detecting unit calculating a minimum current value according to the kickback voltage value and generating a detecting signal;

a timing unit electrically connecting the sensing unit and the detecting unit, the timing unit receiving the sensing signal and the detecting signal to calculate the first period of time and the second period of time and to calculate a discharging time of the first current value being discharged to the minimum current value; and a control unit electrically connecting the timing unit, the control unit controlling the alternating time according to the first period of time, the second period of time and the discharging time so as to generate and send a control signal; and a driving module electrically connecting the motor and the control unit, the driving module receiving the control signal so as to drive the rotor.

2. The detection control system according to claim 1, wherein the motor includes a Brushless DC motor.

3. The detection control system according to claim 1, wherein the control module further includes a storage unit, the storage unit electrically connecting the timing unit for storing the first period of time, the second period of time, the discharging time and the alternating time.

4. The detection control system according to claim 1, wherein the detection unit, the control unit and the driving module are disposed in the chip, the detecting unit is disposed in the group selected from the rotor and the stator, and the chip is disposed close to the stator.

5. The detection control system according to claim 1, wherein the minimum current value includes 0.

6. The detection control system according to claim 1, wherein the chip includes a Hall sensing element and the chip is disposed on the rotor.

7. The detection control system according to claim 1, wherein the polarity of the first magnetic pole is different from the polarity of the second magnetic pole, the polarity of the third magnetic pole is different from the polarity of the fourth magnetic pole, and the polarity of the first, second, third and the four magnetic pole is selected from the north pole and the south pole.

8. The detection control system according to claim 1, wherein the detecting unit further includes a voltage comparator installed with a threshold value, the threshold value to be compared with the kickback voltage value so that the minimum current value is calculated.

9. The detection control system according to claim 1, wherein when the polarity of the third magnetic pole is alternated with the polarity of the fourth magnetic pole, the first current value is decreased to the minimum current value and increased to the second current value.

10. The detection control system according to claim 1, wherein the control unit controls the speed of the first current value changing into the second current value and the alternating time.

* * * * *